United States Patent Office 3,562,232
Patented Feb. 9, 1971

3,562,232
CONTINUOUS POLYMERIZATION OF ACRYLO-NITRILE AND MONO-ETHYLENICALLY UN-SATURATED QUATERNARY AMMONIUM SALTS
Peter Adrian Jarovitzky, Stamford, and Joseph Jacinto Pellon, New Canaan, Conn., assignors to American Cyanamid Company, Stamford, Conn., a corporation of Maine
No Drawing. Filed Oct. 31, 1968, Ser. No. 772,408
Int. Cl. C08f 15/22
U.S. Cl. 260—85.5
5 Claims

ABSTRACT OF THE DISCLOSURE

In the process of continuously polymerizing acrylonitrile with a monoethylenically unsaturated quaternary ammonium salt in an aqueous acidic reaction mass containing a water-soluble inorganic free radical generating polymerization catalyst to produce polymers containing 50 to 70 percent acrylonitrile and 30 to 50 percent monoethylenically unsaturated quaternary ammonium salt, the improvement comprising performing said polymerization in the presence of a concentration of nitrate ions in said reaction mass equal to at least 80 percent of that stoichiometrically equal to the concentration of monoethylenically unsaturated quaternary ammonium salt in solution therein and sufficent to keep said reaction mass fluid.

---

This invention relates to a process for the continuous preparation of copolymers of acrylonitrile with monoethylenically unsaturated quaternary ammonium salts. More particularly, this invention is concerned with an improved suspension polymerization process for the copolymerization in an aqueous medium of acrylonitrile and such quaternary ammonium salts. Still more particularly, the invention relates to an improvement in the preparation of copolymers of acrylonitrile with at least 30 percent of a such quaternary ammonium salt.

Polymers of acrylonitrile and relatively low amounts, i.e., less than about 10 percent of the quaternary salt, have been used in forming fibers and films having good receptivity to acid dyes.

It is well known to prepare such polymers by continuously copolymerizing acrylonitrile and other monomers such as vinyl quaternary ammonium salts in an aqueous medium containing soluble inorganic catalysts such as the sulfoxy activated persulfates or chlorates. As the copolymers are formed in the aqueous medium, they precipitate out of the aqueous reaction mass to form a suspension or a slurry of the polymer product, hence this type of polymerization procedure is known as "suspension" or "slurry" polymerization. Continuous slurry polymerization has won considerable acceptance in the field because of its high productivity capability, the ease with which the polymer is isolated from the aqueous medium, the desirably high molecular weight of the products and other considerations which are well known.

A technique known as "masterbatch" blending of two or more different polymer types has become more and more popular in the synthetic fiber industry as an economic means to providing a variety of polymer products with a minimum of polymer types. Briefly, "masterbatch" blending constitutes the mixing together of a relatively small amount of polymer, very rich in function properties, with a large quantity of a polymer relied upon for physical properties in the fibers to be prepared therefrom. Functional properties include such properties as flame resistance, dyeability and the like, as opposed to physical properties such as strength, abrasion resistance, and so forth. For example, a copolymer of 95 percent acrylonitrile and 5 percent monoethylenically unsaturated quaternary ammonium salt could be made, spun into fiber by conventional methods and have good acid dyeability. However, application of the "masterbatch" blending technique, which is a more desirable technique for the foregoing reasons, would be to form a polymer blend of (a) 90% polyacrylonitrile homopolymer and (b) 10% of a copolymer of 50 percent acrylonitrile and 50 percent quaternary ammonium salt. This polymer blend may then be spun into a fiber having the same good acid dyeability. Additional polymers, rich in other functional properties may also be "masterbatched" with the foregoing.

In order to minimize the concentration of the functional polymer in the polymer blend, it is necessary that the functional copolymer have a high percentage, i.e., at least 30%, of the functional monomer. In the case of monoethylenically unsaturated quaternary ammonium salt functional monomers, high concentrations lead to problems in the polymerization procedure. Generally, these problems are due to the inherent water sensitivity or solubility of such polymers, said water sensitivity increasing with the amount of the quaternary in the polymer. By sensitivity is meant the tendency of an aqueous dispersion of the polymer in water to form a gelled colloidal emulsion (at about 30 percent quaternary) or solution (above about 50 percent quaternay). This sensitivity prevents the use of slurry polymerization techniques to prepare acrylonitrile copolymers containing high amounts of such quaternary ammonium compounds. For example, when known continuous polymerization methods are used to prepare acrylonitrile copolymers containing greater than about 30 percent of the quaternary salt, there is little or no precipitation of the copolymer as it is formed in the aqueous medium. As a result, the aqueous medium becomes progressively thicker due to the dissolved polymer, until gelation of the entire reaction mass takes place, making continued operation impossible.

The point at which gelation occurs is dependent upon the total amount of dissolved polymer and the molecular weight of the polymer. Molecular weight of polymers of the type with which this invention is concerned, in a manner similar to known polyelectrolytes, can be measured in terms of the viscosity at 30° C. of 0.5 percent solution of such polymers in dimethyl formamide (DMF). That is, the relative viscosity is equal to $T/T_0$ where T is the efflux time of a 0.5% solution and $T_0$ is the efflux time of DMF. On this basis, it has been determined that the maximum combination of percent solids and molecular weight which could be used in polymerization processes without complete gelation of the reaction mass can be expressed as $K=34.5$ wherein $$K = (\text{percent solids}) \times (\text{relative viscosity})^{1.88}$$

It will be apparent from the above, therefore, that the percent of solids in the reaction mass and/or molecular weight of the polymer must be restricted in order to continue operation. Surprisingly, efforts to relieve such restrictions by precipitating the formed copolymer from the aqueous reaction medium by the addition of known flocculents such as water soluble metal chlorides, sulfates and the like, have been unsuccessful. Thus, there has not been any practical way of obtaining functional polymers of sufficiently high molecular weight that they do not adversely affect the physical properties of fibers formed from blends therewith. This is particularly true in those instances where relatively large amounts, i.e., 5–20 percent of the functional monomer are desired. Accordingly, there is a need for a convenient and economical method of producing the most desirable products, i.e., high molecular weight copolymers, in desirable yields, i.e., reaction masses with high polymer solids.

It is therefore an object of this invention to provide an improved process for the continuous preparation of acrylonitrile copolymers with 30 to 50 and, preferably, 35 to 45 percent of a monoethylenically unsaturated quaternary ammonium salt copolymerized therewith.

Another object of the invention is to provide such copolymers having significantly higher molecular weights than were previously attainable.

Still another object is to provide a more economical process for the preparation of such copolymers.

Yet another object is to provide a slurry polymerization process for preparing such copolymers.

Other objects will be apparent from the following description of this invention.

Briefly stated, the objects of this invention are accomplished by continuously copolymerizing 50 to 70 percent acrylonitrile with 30 to 50 percent monoethylenically unsaturated quaternary ammonium salt in an aqueous acid solution containing a soluble inorganic polymerization catalyst and nitrate ions in a concentration which is at least about 80% of a stoichiometric amount based upon the concentration of such quaternary ammonium salt in the solution. Surprisingly, the addition of nitrate ion serves to insensitize the copolymers to water sufficiently to precipitate the copolymers from the aqueous medium thereby keeping the reaction mass fluid throughout the reaction period. Conditions may be selected which result in products of much higher molecluar weight and in greater concentrations in the reaction mass without causing gelation of the mass to an inoperable degree.

In the practice of the present invention, continuous polymerization methods such as those disposed in U.S. 2,777,832 (Mallison) may be used. Briefly, these methods involve continuously feeding the reaction mixture components, i.e., monomers, water, catalyst, acid, etc., into a polymerization zone in which the polymer is formed, said zone having an overflow from which polymer product may be drawn off and collected. Substantially "steady state" conditions are maintained in the zone by proper control of feed rates and maintenance of constant temperatures within the range of about 20° C. to 70° C., preferably 40° C. to 60° C. Specifically, the concentrations of monomers, acids and catalyst in the zone are maintained substantially constant with respect to the concentration of polymer. Residence time, that is, the total length of time of any one unit of combined feed components in the zone, is determined by the feed rate.

To practice the present invention, there is also maintained in the reaction zone, a substantially constant concentration of nitrate ions, said concentration being at least 80% of the amount which is stoichiometrically equal to the concentration of monoethylenically unsaturated quaternary ammonium salt in said zone, The maintenance of said concentration of nitrate ion in the zone may be effected by the addition of water soluble metal nitrate compound to an aqueous feed component whose feeding rate is predetermined in accordance with the foregoing guidelines.

The monomers useful in the present invention are acrylonitrile ("AN") and monoethylenically unsaturated quaternary ammonium salts ("VQAS"). The AN content of the copolymer should be about 50–70 weight percent and its VQAS content from 30–50, and preferably 35–45, weight percent. In addition to copolymers of acrylonitrile and VQAS, polymers may also be formed by the method of this invention with minor quantities of other monomers normally copolymerizable with acrylonitrile. Such monomers may be functional or nonfunctional but should not comprise more than about 10 percent by weight of the polymer.

The monoethylenically unsaturated quaternary ammonium salts which are particularly useful in the practice of this invention are the halide salts. For example, 2 - hydroxy - 3 - methacrylyloxypropyltrimethylammonium chloride is currently a commercially available compound of this type. In view of the commercial availability of this monomer, it is used exclusively in the examples to follow wherein it is identified "G–MAC." However, compounds such as 2 - hydroxy - 3 - methacrylyloxypropyl diethylmethylammonium chloride and others of similar character such as are described in U.S. Pat. No. 3,329,706, issued July 4, 1967 may also be used.

The water soluble inorganic polymerization catalysts which are used in the practice of this invention are generally known as sulfoxy activated persulfate or chlorate systems. Such systems are normally used in conjunction with acids such as sulfuric or nitric acid, at a constant pH in the range of about 2–5. For example, the catalyst may comprise potassium persulfate activated by sodium metabisulfite, in which case, best results are obtained using nitric acid to give a pH of about 2.5 to 4.5. Other examples of persulfate compounds which are useful are ammonium persulfate, sodium persulfate and the like. The catalyst may also comprise a sulfoxy activated chlorate such as sodium chlorate, sodium perchlorate, among others. In addition to metabisulfite, other useable sulfoxy compounds include sodium bisulfite and others which generally yield sulfurous acid or hydrosulfurous acid in water. Such catalysts are well known for the preparation of acrylonitrile polymers.

The essential requirement of this invention is the presence of a sufficient concentration of nitrate ions in the reaction zone during polymerization. This may be accomplished by preparation of an aqueous feed component wherein a predetermined amount of a nitrate salt, e.g., sodium nitrate, aluminum nitrate, ammonium nitrate or other nitrate ion source is dissolved. The feed components of this invention need not be separate feeds but may be combined, in those cases which allow combination without undesirable or adverse effects.

The following examples are given to further illustrate the present invention.

EXAMPLE 1

In this example the reaction is carried out in a water jacketed reactor having a volume of 6.1 liters supplied with a propeller-type stirrer driven by a motor at approximately 900 r.p.m. The reactor is equipped with a feed-delivery system and, at the top, with an overfllow tube through which product is withdrawn and collected.

A slurry consisting of 1,220 g. of acrylonitrile polymer in 4,880 g. of water is charged into the reactor as the seed slurry. The slurry is adjusted to a pH of 3.8 with nitric acid after which the stirrer is started and the seed-slurry warmed to 56° C. by means of the water jacket.

Through a feed-delivery system consisting of multiple inlet tubes the following components are introduced into the reactor at the indicated rates.

| | Composition | Rate in ml./hour |
|---|---|---|
| Feed: | | |
| 1 | 100% acrylonitrile | 895 |
| 2 | 16% G–MAC, 6% sodium nitrate, 78% water | 3,000 |
| 3 | 1.38% potassium persulfate, 98.62% water | 1,103 |
| 4 | 0.695% sodium metabisulfite, 0.082% sodium hydroxide, 99.223% water | 1,103 |
| 5 | 3N nitric acid | (1) |

[1] As required.

Each of the feeds 1–4 is fed continuously into the reactor with the 5th feed being used discontinuously as required to control pH. Polymer produced during the first three hours of reaction time is discarded. Under the conditions of reaction, "steady state" is obtained when more than 95 percent of the seed slurry has been purged. Feed rates are chosen so that the reaction mass at "steady state" comprises 20 percent monomer (of which 60 percent is acrylonitrile and 40 percent G–MAC) and 3 percent sodium nitrate. The stoichiometric ratio of nitrate to G–MAC is 1.05. Steady state is maintained for several hours during which the temperature is maintained at 56° C.±1° C. and the pH is maintained between 3.4 and 3.6. Analysis of the reactor overflow indicates a polymer solids content of 18.1 percent of the total mass, indicating a conversion of monomer to polymer of 90.5 percent. From the overflow reaction mass, a quantity of polymer is collected, filtered and washed. The polymer has a relative viscosity of 1.70 (0.5 percent solution in dimethyl formamide at 30° C.) and a "K" value of 49.08 [calculated by the equation $K = (\text{percent solids}) \times (\text{relative viscosity})^{1.88}$].

In order to show the importance of nitrate ions in the foregoing experiment, the entire procedure is repeated with the exception that sodium nitrate is not included in any of the feed components. Increasing thickening of the reaction mass is noted during the purge period, until complete gelation of the reaction mass, after approximately two hours of operation, causes discontinuation of the run.

EXAMPLE 2

Following the procedure and using the compositions and conditions of Example 1, sodium sulfate is substituted for sodium nitrate in Feed 2. As in the procedure described above without sodium nitrate, the reaction mass continued to thicken during the purge period, ending in complete gelation of the reaction mass before steady state could be obtained. This example shows that stoichiometric amounts of sulfate ion, a previously used polymer precipitant, do not perform the same function as the nitrate ion in preventing gelation of the reaction mass.

EXAMPLE 3

This example shows that the polymerization reaction performed without a stoichiometric amount of nitrate ion leads to a very viscous (though not gelled) reaction mass, even though the molecular weight of the product (as estimated by relative viscosity) was considerably lower. The procedure of Example 1 was followed except that the catalyst concentration was altered to decrease the molecular weight of the product and the sodium nitrate was omitted. Feed compositions and rates were as follows:

| Composition | Rate in ml./hour |
| --- | --- |
| Feed: | |
| 1 ........... 100% acrylonitrile | 895 |
| 2 ........... 16% G–MAC, 84% Water | 3,000 |
| 3 ........... 2.21% $K_2S_2O_8$, 97.79% $H_2O$ | 1,103 |
| 4 ........... 1.56% $Na_2S_2O_5$, .31% NaOH, 98.13% $H_2O$ | 1,103 |
| 5 ........... 3N $HNO_3$ | (¹) |

¹ As required for pH 4.0–4.4.

The reaction mass was fluid to thick during the purge period, and, after "steady state" conditions were achieved, remained thick, but not gelled. Polymer did not precipitate from the reaction mass as in Example 1 when nitrate was added. The appearance of the reactor overflow was that of a semi-solution or colloidal emulsion. A known weight of overflow sample was collected and treated with a 5 percent aqueous solution of NaSCN which precipitated the polymer product. The concentration of polymer in the overflow was found to be 18.2 percent of the total sample. The polymer had a relative viscosity of only 1.33. The K value of the product, determined by the above-stated equation, was 31.1. Only very weak films could be prepared from this polymer and while it could be blended in very small quantities with high molecular weight fiber-forming polymers, the amount must be very limited to avoid a significant loss of desirable fiber properties, e.g., strength, recovery, etc.

EXAMPLE 4

To illustrate the operation of the present invention using other polymerization catalysts than a sulfoxy activated persulfate catalyst, a series of experiments was conducted in which a sulfoxy activated chlorate catalyst was used. Specifically, one gram of $NaClO_3$ per 100 g. of monomer and 3 moles of $Na_2S_2O_5$ per mole of $NaClO_3$ were fed into a reactor by a common feed following, in other respects, the procedure of Example 1. The feed composition contained 20 percent monomer of which 60% was AN and 40% was G–MAC. In Run 4A no nitrate was added, and in runs 4B and 4C, 3.0% and 5.0% nitrate ion, respectively, were added. Listed in the table below are the results of this series of runs:

| | Percent $NaNO_3$ | Reactor solids, percent | Polymer relative viscosity | K value |
| --- | --- | --- | --- | --- |
| Run: | | | | |
| 4A | None | | (¹) | |
| 4B | 3.0 | 17.6 | 2.075 | 69.4 |
| 4C | 5.0 | 17.8 | 2.23 | 80.4 |

¹ Completely gelled after 2 hr.

It wll be noted from the data, that the reactor mass remained fluid when nitrate ions were added and that increased concentration of nitrate ion was accompanied by and increase in molecular weight of the product, all other conditions being equal.

EXAMPLE 5

This example shows that the effect of nitrate ion in allowing high levels of polymer solids in the reaction mass even at higher polymer molecular weight levels without gelation of the mass. Runs were made using the procedures of Example 1, the solids in the reaction mass being increased to the indicated levels, by increasing the monomer concentration of the total feed composition. Again the monomer feed composition was 60% of AN and 40% of G–MAC and the catalyst system was $K_2S_2O_8$ and $Na_2S_2O_5$. The data are listed in the following table:

| | Percent total monomer | Percent G–MAC | Percent $NaNO_3$ | $NO/G$-$MAC$ ratio | Percent solids | Relative viscosity | K |
| --- | --- | --- | --- | --- | --- | --- | --- |
| 5A | 20 | 8.0 | 0 | | 17.3 | 1.20 | 27.9 |
| 5B | 20 | 8.0 | 1.5 | 0.525 | (Reaction gelled) | | |
| 5C | 20 | 8.0 | 3.0 | 1.05 | 18.35 | 1.65 | 47.0 |
| 5D | 25 | 10.0 | 0 | | (Reaction) gelled) | | |
| 5E | 25 | 10.0 | 3.0 | 0.843 | 24.2 | 1.57 | 56.5 |
| 5F | 30 | 12.0 | 0 | | (Reaction gelled) | | |
| 5G | 30 | 12.0 | 4.5 | 1.05 | 26.8 | 1.18 | 36.5 |

Runs 5D and 5F gelled due to the absence of added nitrate ions in a reaction mass in which the combination of solids and molecular weight would be expected to have exceeded a K value of 34.5. Run 5B also gelled because the amount of nitrate ion present in the reaction was less than the amount required based upon the amount of G–MAC present. Runs 5A, 5C, 5E, and 5G were all fluid. Run 5E contained sloghtly less than the stoichiometric amount of $NO_3$— but more than 80% of the stoichiometric amount.

EXAMPLE 6

The effect noted in Example 5, run 5B where less than the required amount of $NO_3$— is present will be amplified by reference to this example. A series of runs was conducted wherein 25 percent of the reaction component was monomer having a composition of 55 percent AN and 45 percent G–MAC. Thus, 11.25 percent G–MAC was present on total weight of reaction mass. In separate runs, increasing amounts of sodium nitrate were added by the procedures of Example 1. Following are the results of these runs. They show that $NO_3-$ ion concentrations of even 75% stoichiometric requirements do not prevent gelling whereas a stoichiometrically equal amount, based on the concentration of G–MAC gives a reaction mass which remains fluid through it has a high solids content of high molecular weight polymer.

| Run: | Percent NaNO$_3$ | Ratio NO$_3$ G-MAC | Percent solids | Relative viscosity | K | Comments |
|---|---|---|---|---|---|---|
| 6A | 1.0 | 0.25 | | (Reaction gelled) | | |
| 6B | 3.0 | 0.75 | | (Reaction gelled) | | |
| 6C | 4.25 | 1.06 | 23.0 | 1.36 | 41.0 | Reaction fluid. |

We claim:

1. In the process of continuously polymerizing acrylonitrile with a monoethylenically unsaturated quaternary ammonium salt in an aqueous acidic reaction mass containing a water-soluble inorganic free radical generating polymerization catalyst to produce polymers containing 50% to 70% acrylonitrile and 30% to 50% monoethylenically unsaturated quaternary ammonium salt, the improvement comprising performing said polymerization in the presence of a concentration of nitrate ions in said reaction mass equal to at least 80% of that stoichiometrically equal to the concentration of monoethylenically unsaturated quaternary ammonium salt in solution therein and sufficient to keep said reaction mass fluid.

2. The process of claim 1 in which the polymerization catalyst is a sulfoxy activated persulfate.

3. The process of claim 1 in which the polymerization catalyst is a sulfoxy activated chlorate.

4. The process of claim 1 in which the nitrate ion concentration is maintained by addition of sodium nitrate.

5. The process of claim 1 in which the monoethylenically unsaturated quaternary ammonium salt is 2-hydroxy - 3 - methacrylyloxypropyltrimethyl ammonium chloride.

References Cited

UNITED STATES PATENTS

| | | | |
|---|---|---|---|
| 2,572,560 | 10/1951 | Ham | 260—85.5 |
| 2,617,781 | 11/1952 | Lytton | 260—85.5 |
| 2,616,922 | 11/1952 | Ringwald et al. | 260—85.5 |
| 2,744,130 | 5/1956 | Winberg | 260—85.5 |
| Re. 24,164 | 6/1956 | Barney | 260—85.5 |
| 2,764,578 | 9/1956 | Barney | 260—85.5 |
| 2,883,370 | 4/1959 | Price | 260—85.5 |
| 2,941,969 | 6/1960 | Price | 260—85.5 |
| 2,980,657 | 4/1961 | Melamed | 260—85.5 |
| 3,483,172 | 12/1969 | Shibukawa et al. | 260—85.5L |

HARRY WONG, JR., Primary Examiner

U.S. Cl. X.R.

260—29.6, 32.6, 898